US008899520B2

(12) United States Patent
Barmichev et al.

(10) Patent No.: US 8,899,520 B2
(45) Date of Patent: Dec. 2, 2014

(54) MID-WING AIRPLANE

(75) Inventors: Sergey Barmichev, Bothell, WA (US);
Mithra M. Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 1310 days.

(21) Appl. No.: 12/471,391

(22) Filed: May 24, 2009

(65) Prior Publication Data

US 2012/0160968 A1 Jun. 28, 2012

(51) Int. Cl.
*B64C 1/00* (2006.01)
*B64C 1/26* (2006.01)
*B64C 25/12* (2006.01)
*B64D 11/00* (2006.01)

(52) U.S. Cl.
CPC ... *B64C 1/00* (2013.01); *B64C 1/26* (2013.01); *B64C 25/12* (2013.01); *B64D 11/00* (2013.01); *B64C 2001/0027* (2013.01); *B64C 2025/125* (2013.01); *Y02T 50/46* (2013.01)
USPC ...................................... 244/119

(58) Field of Classification Search
CPC .............. B64C 2001/0027; B64C 2001/0036; B64C 30/00; B64C 1/061; B64C 1/064; B64D 11/00; B64D 13/04
USPC .............. 244/13, 15, 36, 118.1, 118.5, 118.6, 244/119
See application file for complete search history.

(56) References Cited

U.S. PATENT DOCUMENTS

| 1,859,807 | A | | 5/1932 | Stout |
| D92,189 | S | | 7/1933 | Minshall et al. |
| 2,236,482 | A | * | 3/1941 | Zindel ........................... 244/119 |
| 2,500,015 | A | * | 3/1950 | Tweney et al. ................ 244/119 |
| 2,967,034 | A | * | 1/1961 | Eyre .............................. 244/119 |
| 3,948,469 | A | | 4/1976 | Brown |
| 4,641,796 | A | | 2/1987 | Feifel |
| 5,086,996 | A | * | 2/1992 | Roeder et al. ................. 244/119 |
| 5,893,535 | A | * | 4/1999 | Hawley ......................... 244/119 |
| 5,992,797 | A | | 11/1999 | Seidel et al. |
| 6,047,923 | A | * | 4/2000 | Lafferty ........................... 244/15 |
| 6,478,253 | B1 | | 11/2002 | Seidel |

(Continued)

FOREIGN PATENT DOCUMENTS

FR 868162 12/1941
WO WO 2006/005550 A1 1/2006

(Continued)

OTHER PUBLICATIONS

The AC—120 The Advanced Commercial Transport Preliminary Design of a 100 to 150 Passenger Commercial Transport Presented to: Professor Robert van't Riet Aeronautical Engineering Department California Polytechnic State University San Luis Obispo, CA May 14, 1993.

(Continued)

*Primary Examiner* — Valentina Xavier
(74) *Attorney, Agent, or Firm* — Parsons Behle & Latimer

(57) ABSTRACT

An airplane includes a wing mounted mid-level on a tubular fuselage. The wing includes carry-through that passes transversely through the fuselage and divides a cabin deck into fore and aft sections. At least one longitudinal passageway in the carry-through structure allows passenger/crew walk-through between the fore and aft sections of the deck.

20 Claims, 13 Drawing Sheets

(56) References Cited

U.S. PATENT DOCUMENTS

| | | |
|---|---|---|
| 6,705,567 B2 * | 3/2004 | Dong et al. ..................... 244/13 |
| 6,772,977 B2 | 8/2004 | Dees et al. |
| 7,395,989 B2 * | 7/2008 | Saint-Jalmes et al. ..... 244/118.1 |
| 2002/0153454 A1 * | 10/2002 | Seidel ........................... 244/119 |
| 2003/0052228 A1 * | 3/2003 | Sankrithi ...................... 244/119 |
| 2008/0191087 A1 | 8/2008 | Cros |
| 2008/0245925 A1 | 10/2008 | Udall |
| 2008/0251641 A1 | 10/2008 | Sprenger |
| 2008/0309201 A1 | 12/2008 | Ota |
| 2010/0012773 A1 | 1/2010 | Im |

FOREIGN PATENT DOCUMENTS

| | | |
|---|---|---|
| WO | WO2008102278 A2 | 8/2008 |
| WO | WO 2008102278 A2 * | 8/2008 |
| WO | WO 2008/132087 A1 | 11/2008 |

OTHER PUBLICATIONS

Low Direct Operating Cost Transpacfic Commercial Transport Family John M. Swihart, President-Swihart Consulting, Inc. Robert Benton Brown, President-Airplane Design Associates American Institute of Aeronautics and Astronautics, Inc. 1997.

VLCT—13, A Commercial Transport for the 21st Century California Polytechnic State University San Luis Obispo, CA May 14, 1993 NASA Technical Report No. NASA-CR-195492.

Patent Cooperation Treay; International Search Report and Written Opinion for PCTUS2012029549 dated Jan. 2, 2013.

* cited by examiner

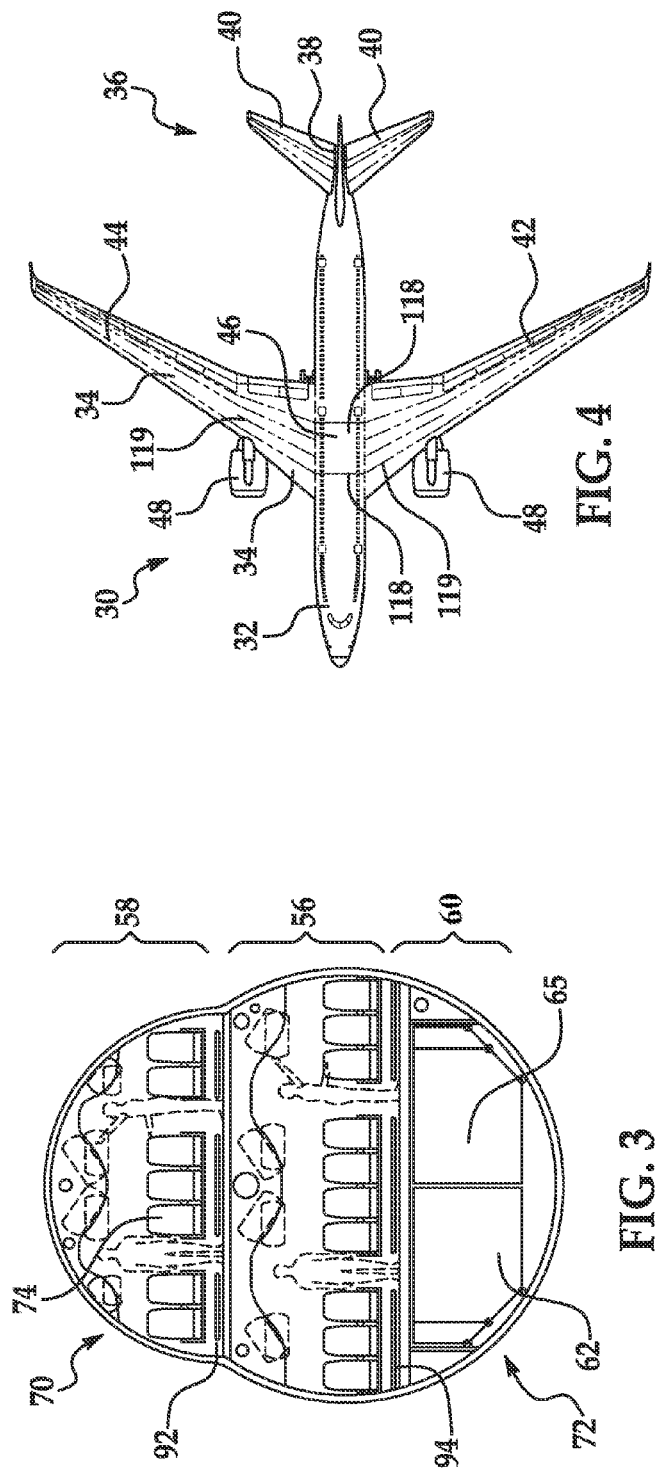

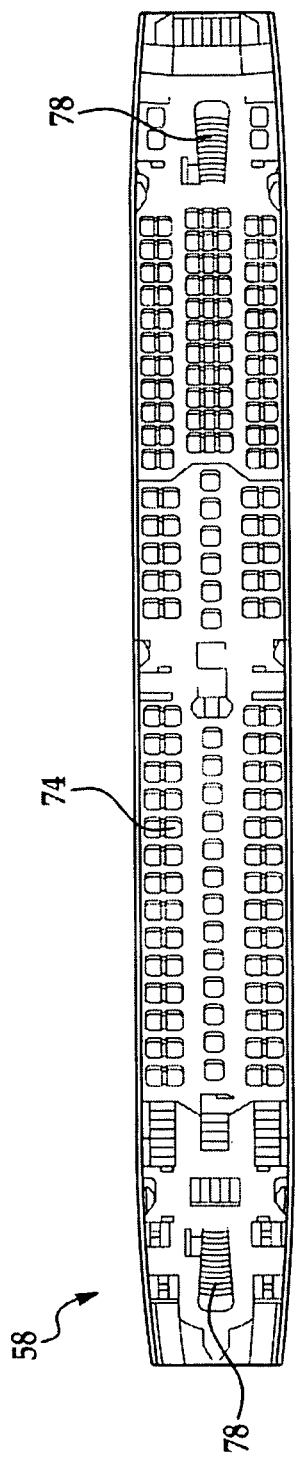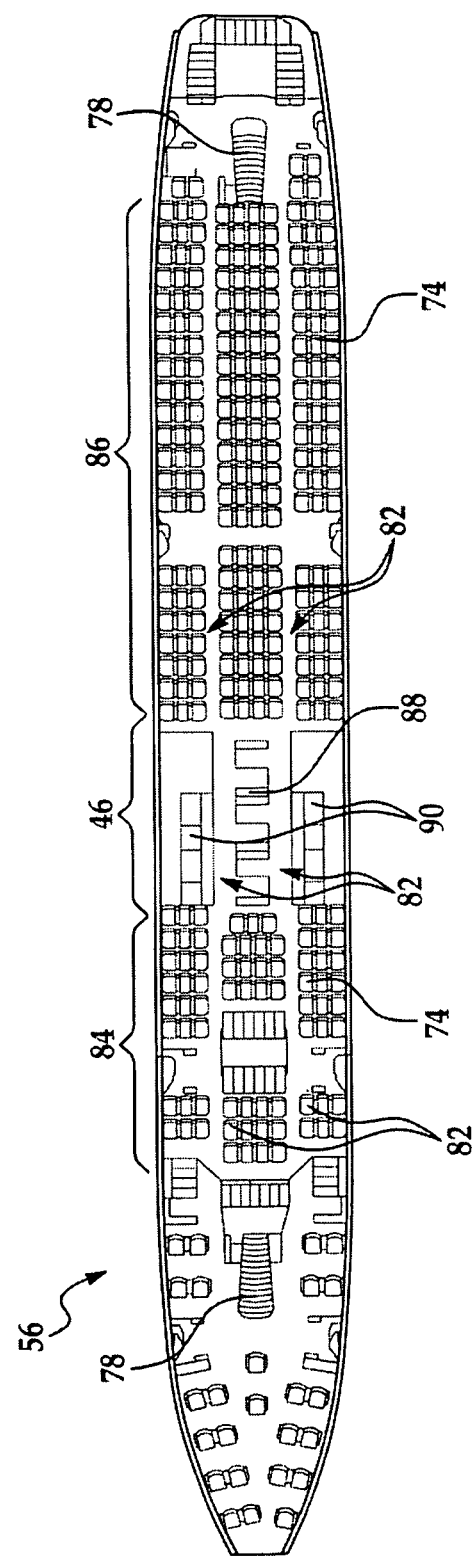

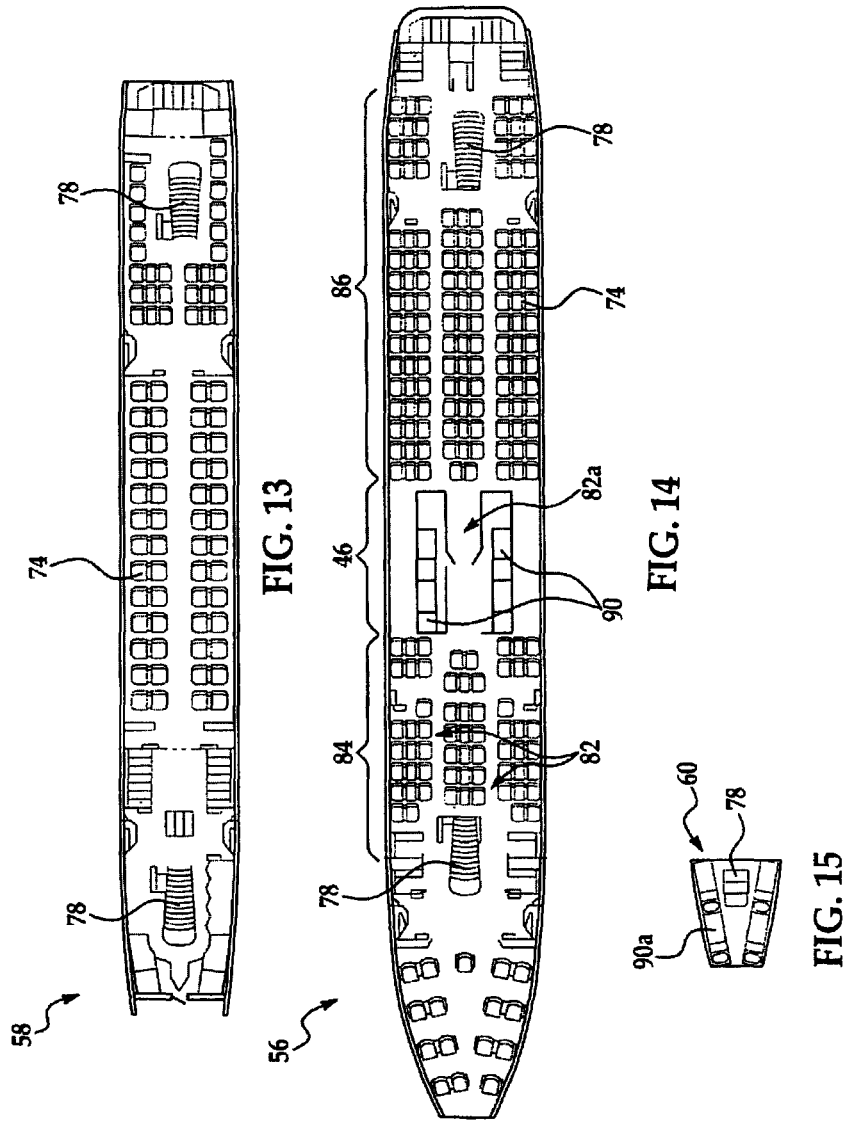

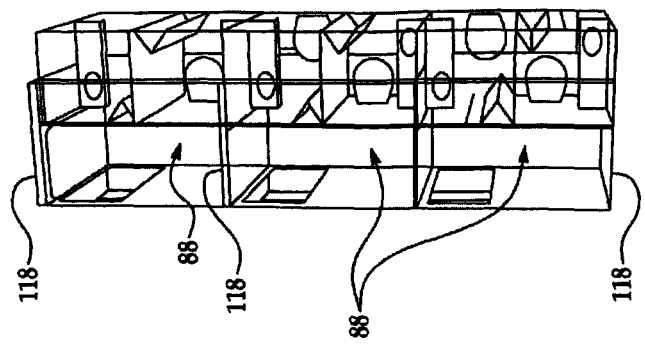
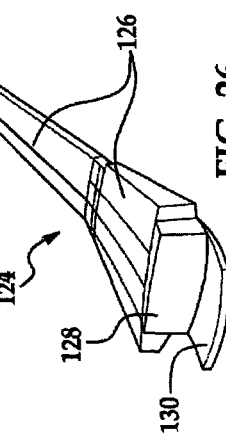
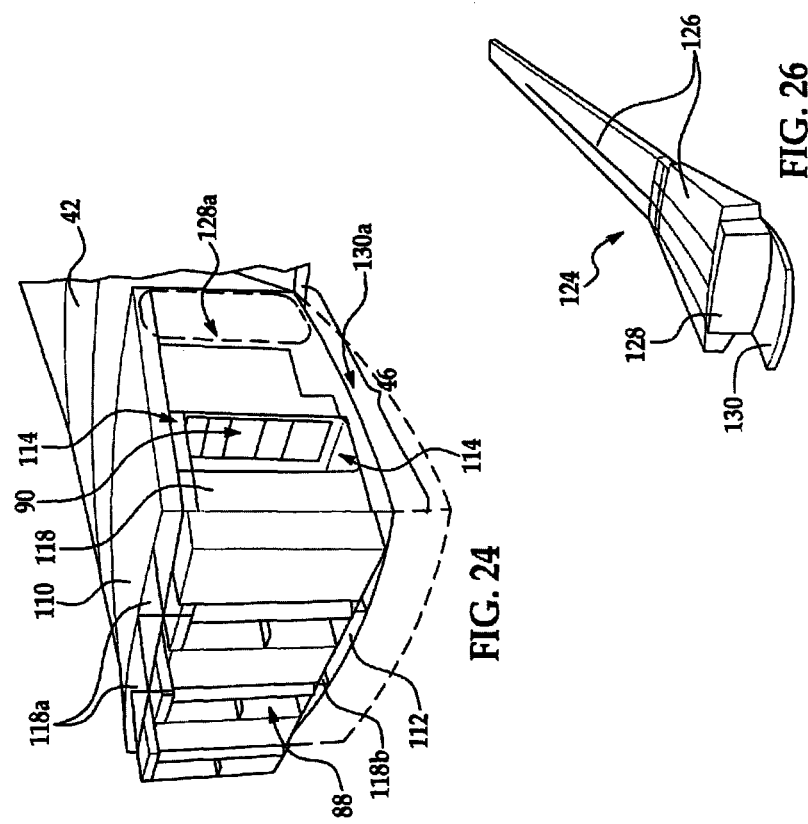

MID-WING AIRPLANE

TECHNICAL FIELD

This disclosure generally relates to aircraft, and deals more particularly with an airplane having a tube type fuselage and a mid-level wing that passes though a deck in the fuselage.

BACKGROUND

Advanced designs for high capacity commercial and military airplanes require operating efficiency combined with reduced emissions and low noise. In order to meet these requirements, super-high bypass ratio jet engines, such as geared turbo fan or open rotor jet engines may be used. These engines typically employ larger diameter engine fans, rotors and/or nacelles which, because of their size, may place design constraints on other components of the airplane. For example, larger diameter engines mounted beneath the primary lifting wing on the airplane may require excessive inboard wing shear and associated large weight penalties on a low-wing airplane configuration, or alternatively may require that the wing be positioned at a higher level on the fuselage in order to provide sufficient ground clearance beneath the engines. This higher placement of the wing on the fuselage may in turn place constraints on the configuration of payload carrying decks within the fuselage.

Accordingly, there is a need for a mid-wing airplane that allows the use of high efficiency, large diameter engines with minimal adverse impact on the capacity and layout of payload carrying decks.

SUMMARY

The disclosed embodiments provide an airplane configuration well suited for tube-wing type, relatively large subsonic commercial or military applications where relatively high payload capacity is required along with the use of higher efficiency engines and a minimum of airplane wetted area. These objectives are achieved in part, by optimal positioning of the wing on the fuselage to accommodate relatively large diameter engines beneath the wing, without increasing the height of the fuselage above the ground, and without the need for excessive inboard wing shear or wing dihedral. These features are particularly well suited to use of composite materials to fabricate the wing since the tension-compression load paths on the wing panels are substantially straight.

The wing includes carry-through structure passing through a payload carrying deck. The carry-through structure includes one or more full-height passageways allowing free flow of passengers or crew between fore and aft sections of the deck, as well as carry-through structural elements above and below the passageways. In addition to the one or more passageways, the wing carry-through structure may be utilized for passenger or crew support facilities such as galleys, rest areas or lavatories, as well as fuel storage volume(s) appropriately separated from passenger and crew use volume(s).

According to one disclosed embodiment, an airplane comprises a fuselage including at least a first longitudinal extending payload carrying deck. A wing is mounted on the fuselage at the level of the first deck and includes first and second wing panels respectively on opposite sides of the fuselage. The wing further includes a carry-through structure within the fuselage that connects the wing panels. The carry-through structure passes transversely through the fuselage and includes at least one full passenger height passageway allowing passage along the first deck through the carry-through structure. At least one engine is mounted beneath each of the wing panels. The airplane may further comprise main landing gear mounted on and retractable substantially entirely within the fuselage beneath the first deck. The carry-through structure may include upper and lower structural panels extending continuously across the fuselage, and spars connected to the upper and lower structural panels and extending across the fuselage. The carry-through structural may include a service area comprising at least one of a of a galley, a galley cart stowage facility, a lavatory, a crew rest facility, a passenger rest facility, a medical facility, a lounge, a bar, a play area, and a storage facility.

According to another embodiment, an airplane comprises a generally tubular fuselage and a wing mounted on the fuselage. The tubular fuselage includes at least a first longitudinal extending payload carrying deck, and a second longitudinally extending payload carrying deck stacked above the first deck. The wing passes transversely through the first deck and divides the first deck into a fore section and an aft section. The wing includes carry-through structure extending continuously across the fuselage and having a longitudinal passageway therein allowing walk-through between a fore and aft sections of the deck. The cross section of the fuselage may comprise a double bubble configuration.

According to a further embodiment, a mid-wing, multi-deck airplane comprises a generally tubular fuselage and a mid-level wing having first and second wing panels. At least one engine is mounted on each of the wing panels beneath the wing. Main landing gear is mounted on and retractable substantially entirely within the fuselage. The tubular fuselage includes at least one longitudinally extending mid-level payload deck and a longitudinally extending upper payload deck above the mid-level deck. The wing passes through the mid-level deck and includes a carry-through structure connecting the wing panels. The carry-through structure divides the mid-level deck into fore and aft sections and includes at least one longitudinally extending passageway therein forming a walk-through aisle between the fore and aft sections of the mid-level deck. The airplane further comprises first and second fuel tanks respectively within the first and second wing panels wherein each of the fuel tanks includes an inboard portion extending into the carry-through structure.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

FIG. 3 is a sectional illustration taken along the line 3-3 in FIG. 2.

FIG. 4 is an illustration of a plan view of the airplane shown in FIGS. 1 and 2.

FIG. 5 is an illustration of a front view of the airplane shown in FIGS. 1 and 2.

FIG. 6 is an illustration of a plan view of an upper deck of the airplane shown in FIGS. 1 and 2.

FIG. 7 is an illustration of a plan view of a mid-level deck of the airplane shown in FIGS. 1 and 2.

FIG. 13 is an illustration of a plan view of an upper deck of the airplane shown in FIG. 12.

FIG. 14 is an illustration of a plan view of a mid-level deck of the airplane shown in FIG. 12.

FIG. 15 is an illustration of a plan view of a lower hold of the airplane shown in FIG. 12.

FIG. 24 is a perspective illustration showing lavatory and rest area facilities located in the carry-through structure.

FIG. 25 is an illustration of a top view of the lavatories shown in FIG. 24.

FIG. 26 is a perspective illustration of a wing tank that includes portions extending into the carry-through structure.

DETAILED DESCRIPTION

Figure 1:
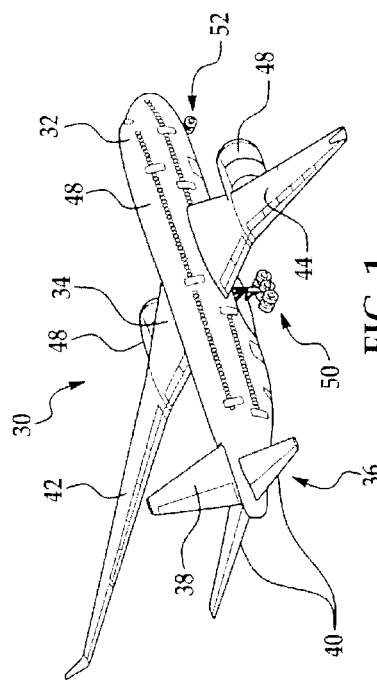
FIG. 1 is a perspective illustration of an airplane having a mid-wing according to the disclosed embodiments.

Referring first to FIGS. 1-7, an airplane 30 includes a tubular type fuselage 32, a mid-wing 34 and an empennage 36 comprising a vertical stabilizer 38 and horizontal stabilizers 40. The airplane 30 further includes a retractable nose gear 52 and main landing gear which are retractable into a wheel well 54 (FIG. 2) within the fuselage 32. As seen in FIG. 4, the wing 34 comprises a left (port) wing panel 42 and a right (starboard) wing panel 44 connected by carry-through structure 46 which passes through and is connected to the fuselage 32. The wing panels 42, 44 include wing spars 119, at least some of which either extend through the carry-through structure 46 or are connected to spars 118 forming part of the carry-through structure 46.

The fuselage 32 includes fore and aft pressure bulkheads 66, 68 respectively which permit pressurization of a first, mid-level cabin deck 56 and a second, upper level cabin deck 58 which is stacked above the mid-level cabin deck 56. As shown in FIGS. 6 and 7, fore and aft stairways 78 connect the mid-level and upper level decks 56, 58 respectively. In the illustrated example, cabin decks 56 and 58 are fitted with seats 74 for carrying passengers however, decks 56, 58 may carry any of a variety of payloads such as cargo, military equipment, etc. When employed in passenger applications, the airplane 30 shown in FIGS. 1-7 has a relatively high passenger capacity (350+ passengers), accommodating seven seats abreast on the upper deck 58 and ten seats abreast on the mid-level deck 56 in a 10+6 configuration. Different seats abreast can be employed in variant embodiments. A third, lower deck 60 beneath the mid-level deck 56 includes a cargo area 65 which is divided into fore and aft cargo sections 62, 64 by a wheel well 54 used to store the main landing gear 50. The cargo area 65 may be capable of accommodating at least one or more of a bulk cargo, or a unit load device (not shown) comprising one or more of an LD-3 container, an LD-1 container, an LD-2 container, an LD-3-46 container and an LD-3-45 container.

Figure 2:
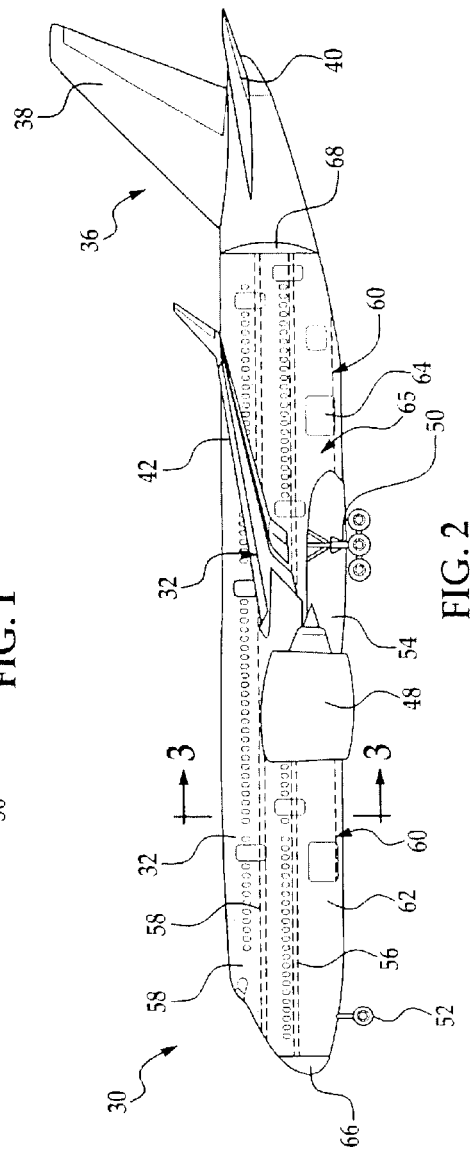
FIG. 2 is a side view illustration of an airplane similar to FIG. 1 and illustrating the location of multiple decks relative to the mid-wing.

As used herein, "mid-wing" refers to the mid-level placement of the wing with full-size passengers/crew access passages 34 on the fuselage 32, in contrast to a "high" wing configuration or a "low" wing configuration. In the illustrated example, the wing 34 is connected to the fuselage 32 at the level of the mid-level deck 56, and the carry-through structure 46 passes transversely through the mid-level deck 56. As referred to herein, "carry-through structure" 46 refers to structural elements or components that connect the wing panels 42, 44 within the fuselage 32. As best seen in FIGS. 2 and 7, the carry-through structure 46 divides the mid-level deck 56 into a fore section 84 and an aft section 86.

As shown in FIG. 5, mounting of the wing 34 at a mid-level on the fuselage 32, i.e. at the mid-level deck 56 provides adequate clearance 78 between the ground 76 and relatively large diameter, high efficiency engines 48, which may be for example, and without limitation, geared turbo fan or open rotor jet engines. Mid-level wing placement also has the benefit of lower values of interference drag with the fuselage 32 and a reduced need for fairings between the wing 34 and fuselage 32. Fairings may not be required or reduced in size for the mid-level wing of the disclosed embodiments, thus resulting in reduced weight and drag due to the additional wetted surface of the fairing.

Figure 8:
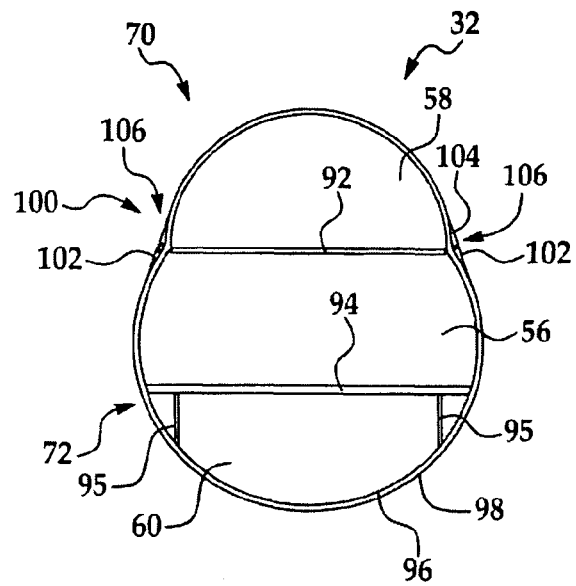
FIG. 8 is a diagrammatic cross sectional illustration of a double bubble fuselage.

Referring now particularly to FIGS. 2 and 8, the fuselage 32 may be of a so-called double bubble configuration comprising an upper generally circular lobe 70 and a lower generally circular lobe 72 which are joined together at an intersection area 100. Placement of the wing 34 at a mid-level position on the fuselage 32 results in the lower lobe 72 being substantially free of obstructions except for stowed landing gear from front to rear, thereby increasing the volume of space available for revenue cargo.

In cross section, the intersection area 100 between the upper and lower lobes 70, 72 respectively is generally V-shaped. In order to improve the aerodynamics of the fuselage 32, a fairing 102 may cover the intersection area 100, thereby forming a longitudinally extending, conduit-like recess 104. Utilities 106 such as communication lines 106 may be mounted within the recess 104. Each of the lobes 70, 72 may comprise a metal or composite frame 96 covered by an outer skin 98 which may also be of either metal or composite materials. In the disclosed embodiment, the upper deck 58 is contained within the upper lobe 70, while the mid-level deck 56 and lower level decks 60 are contained within the lower lobe 72. A first cabin floor 92 supporting the upper deck 58 extends across the diameter of the upper fuselage section 70, while a second cabin floor supported by stanchions 95 extends across the lower fuselage section 72 to support the mid-level deck 56.

Figure 9:
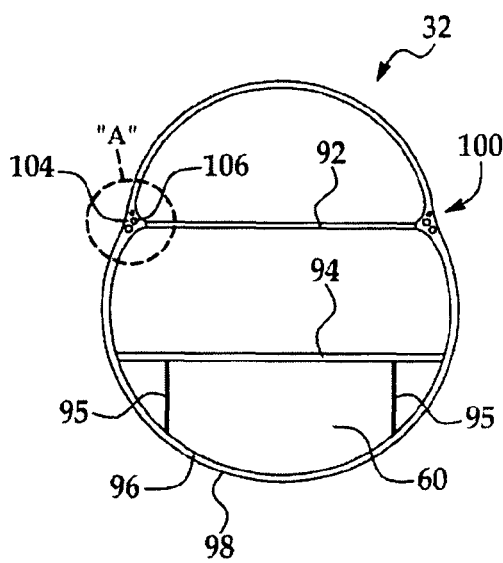
FIG. 9 is an illustration similar to FIG. 8 but showing an alternate form of the double bubble fuselage construction.
Figure 10:
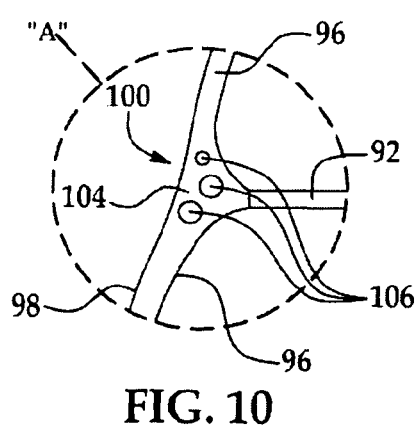
FIG. 10 is an enlarged illustration of the area designated as "A" in FIG. 9.

Referring now to FIGS. 9 and 10, in lieu of the fairing 102 shown in FIG. 8, the outer skin 98 may be formed continuously over the intersection area 100 in order to form a smooth, aerodynamic transition including a concave segment over area 100 between two convex segments over the upper and lower lobes 70, 72. The frame 96 may include a truss-like portion 104 which supports and back the skin 98 and provides a means for mounting the communication lines 106.

Figure 11:
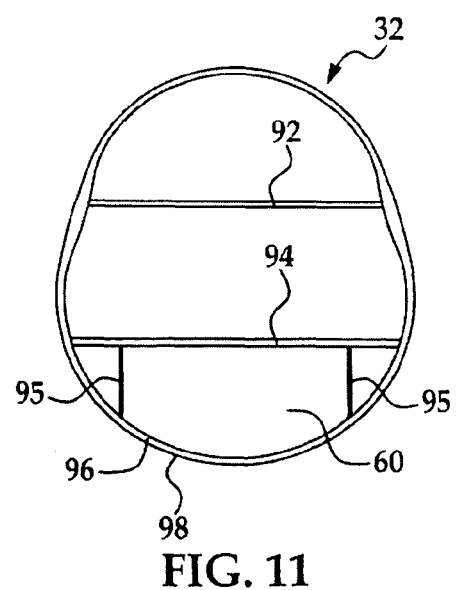
FIG. 11 is an illustration similar to FIGS. 8 and 9 but showing a fuselage construction having a generally oval cross section.
Figure 12:
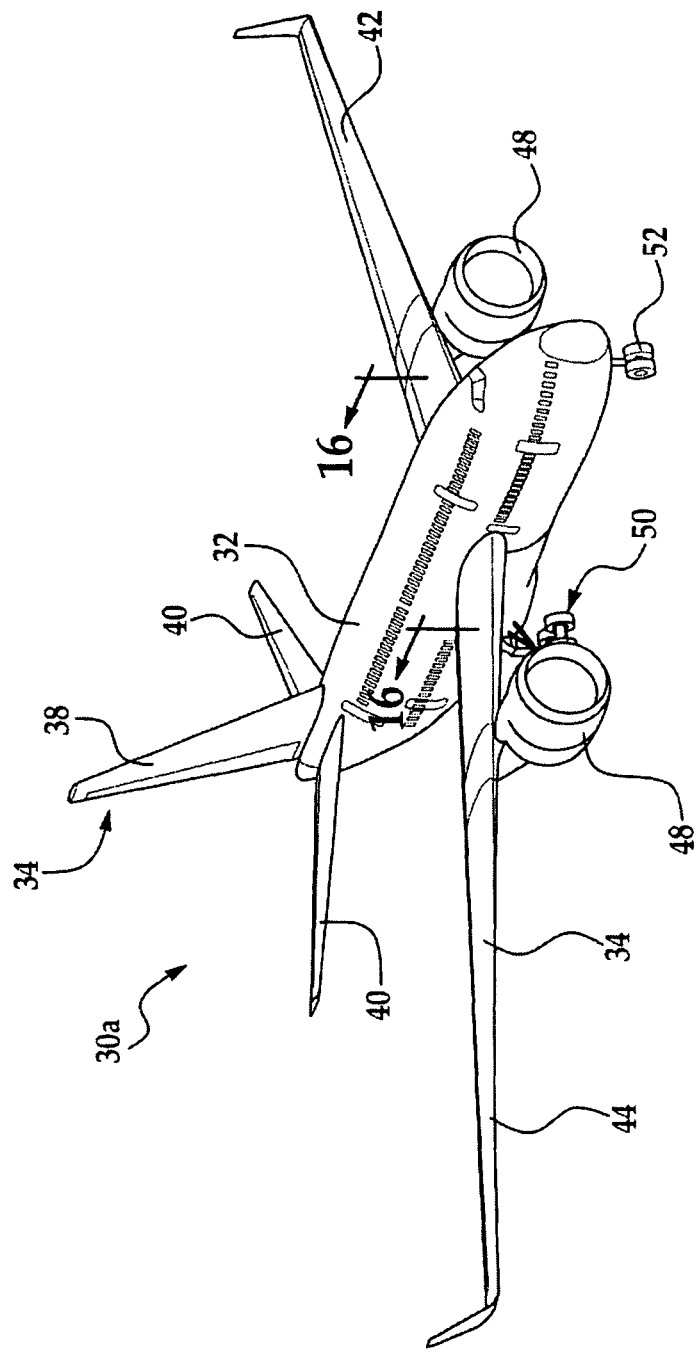
FIG. 12 is a perspective illustration of a medium passenger capacity (below 300 passengers in triple class) mid-wing passenger airplane.

The disclosed mid-wing configuration and carry-through structure 46 may be used in connection with an airplane having a fuselage 32 of the type shown in FIG. 11 which is generally oval in cross section. In this type of fuselage 32, the depth of the frame 98 is generally increases monotonically with increases to the radius of curvature of the fuselage 32.

Figure 16:
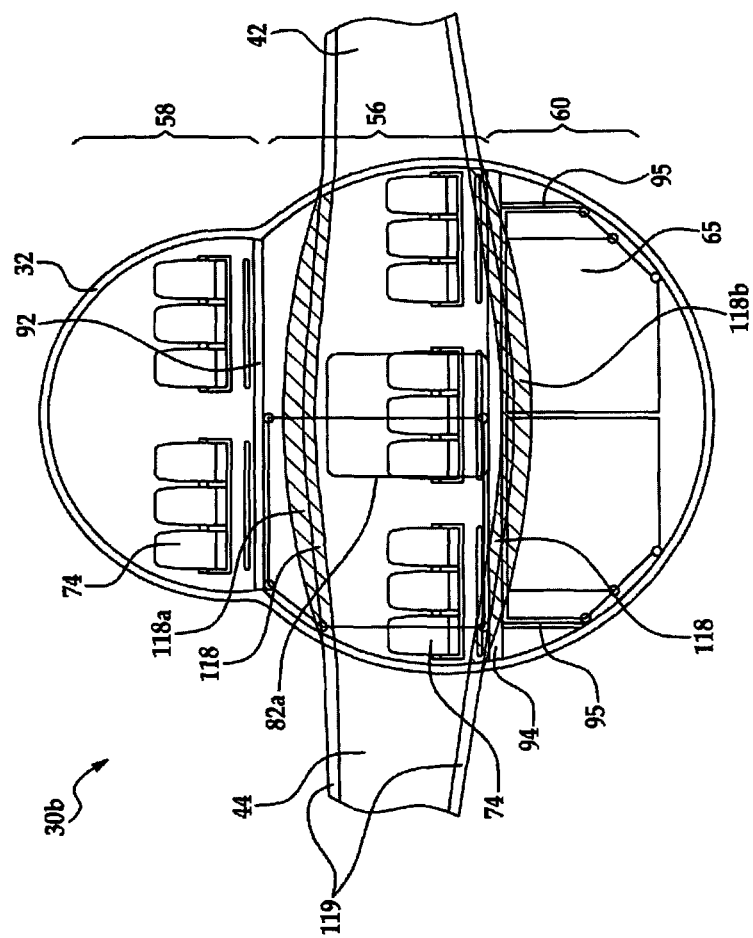
FIG. 16 is a sectional illustration taken along the line 16-16 in FIG. 12.

The airplane 30 previously described in connection with FIGS. 1-11, has a relatively wide-body fuselage 32 capable of carrying, for example and without limitation 350+ passengers and related cargo. However, features of the disclosed embodiments, including the carry-through structure 46, may be scaled for use in airplanes having smaller fuselages, and fuselages having any of a variety of cross sectional shapes and sizes. For example, FIGS. 12-16 illustrate a triple class airplane 30a capable of carrying approximately 295 passengers and cargo. Seating 74 is placed on mid-level and upper decks 56, 58 respectively, in a 9+6 configuration. The carry-through section 46 of the wing 34 includes a full height passage center aisle 82a with crew/passenger rest facilities 90 on each side of the aisle 82a. The lower deck 60 may include a hold having an attendant rest area 90a connected to the mid-level deck 56 by stairs 78. As shown in FIG. 16, the lower level deck 60 may also include one or more cargo areas 65 capable of stowing, for example LD-1 and LD-3 container (not shown). Wing spars 119 can be seen to be connected to spars 118 forming part of the carry-through structure 46. Spars 118 include upper and lower spar extensions 118a, 118b the purpose of which will be discussed later in more detail.

Figure 17:
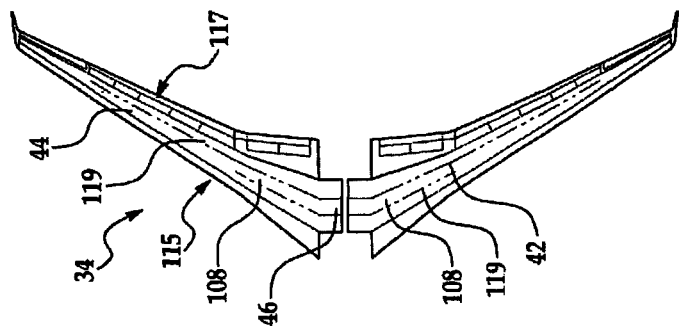
FIG. 17 is an illustration of a plan view of a wing wherein the carry-through structure and wing panels form an integrated, single module.
Figure 18:
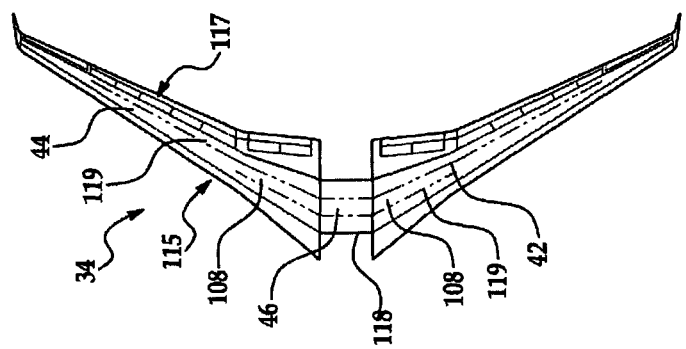
FIG. 18 is an illustration similar to FIG. 17 but depicting the carry-through structure as a separate wing central section module connected to the wing panels.
Figure 19:
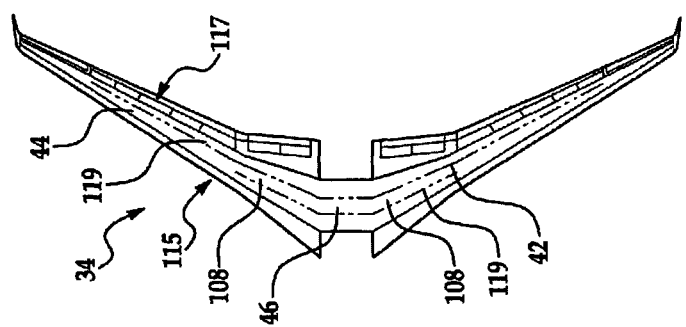
FIG. 19 is an illustration similar to FIG. 17 but showing the carry-through structure integrated into the roots of the center-splice wing panels.

Attention is now directed to FIG. 17-19 which illustrate various alternate embodiments of the wing 34. Each of the wing panels 42, 44 includes a leading edge 115, a trailing edge 117 and a wing box 108 which includes spars 119. In the embodiment shown in FIG. 17, the wing box 108 extends through the fuselage 32 (not shown in FIG. 17) so that the carry-through structure 46 is integrally formed with the wing panels 42, 44 and the wing 44 is essentially a single module or piece, tip-to-tip. Alternatively, as shown in FIG. 18 wing panels 42, 44 are joined to the side of the fuselage 32 and the carry-through structure 46, which forms a central wing section, may be respectively formed as individual modules or sections that are joined together during the production process to form the wing 34. In the embodiment shown in FIG. 18, the carry-through structure 46 includes spars 118 that are connected with wing spars 119 during the production process. As a further alternative, FIG. 19 depicts a center-line spliced type wing, in which one half of the carry-through structure 46 is integrated into the root of each wing panel 42, 44 so that the wing 34 is formed of two modules or sections that are joined together during the production process.

As a result of the carry-through structure 46 passing through the mid-level deck 56, various passenger and crew support functions (e.g., a galley, a galley cart stowage facility, a lavatory, a crew rest facility, a passenger rest facility, a medical facility, a lounge, a bar, a play area, and a storage facility) may be placed in a central location between the fore and aft sections 84, 86 of the deck 56. Consolidation of these functions in a central location within the wing carry-through structure 46 to the left and/or right of a longitudinally extending passageway or corridor 114 (shown in FIGS. 20-22), allows passenger seating to extend between adjacent aisles 82 along the entire lengths of the fore and aft sections 84, 86, thus minimizing wasted space and maximizing passenger count for a given cabin length. The carry-through structure is well suited for placement of crew and passenger support functions such as lavatories, galleys, galley cart storage and closets, since these areas may not require the full height clearance required for a passenger aisle. During emergency evacuation, the absence of seating along the carry-through structure 46 may improve passenger traffic flow along that length of the cabin since merging passengers would not be present to disrupt flow.

Figure 21:
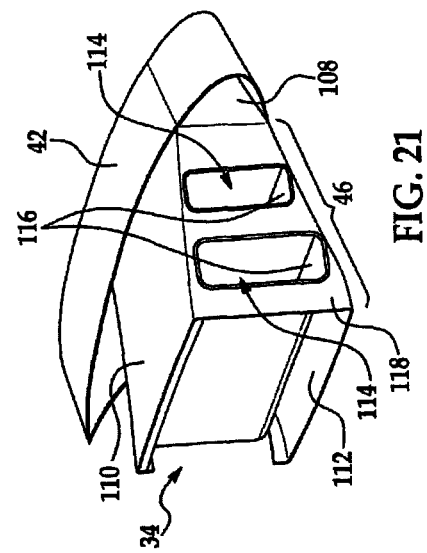
FIG. 21 is an illustration similar to FIG. 20 but depicting two passageways in one half of the carry-through structure.
Figure 20:
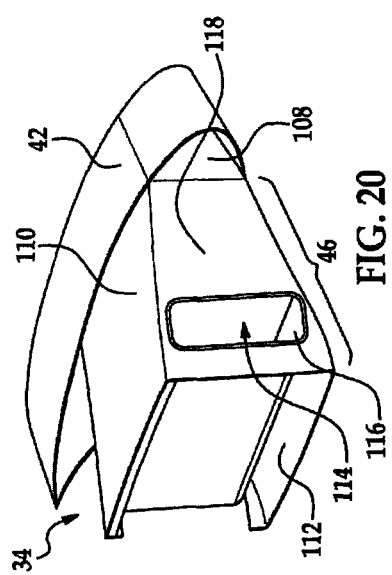
FIG. 20 is a perspective illustration of one half of the carry-through structure having a single passageway therein.
Figure 22:
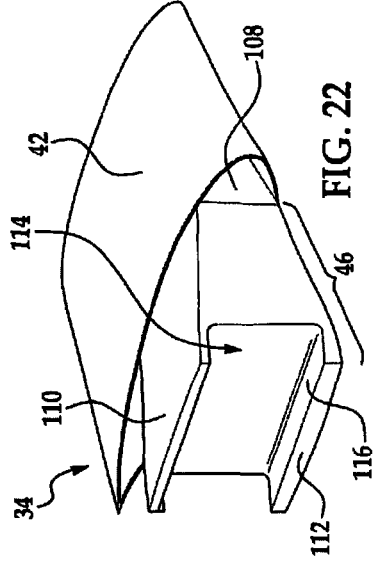
FIG. 22 is an illustration similar to FIG. 20 but showing the passageway being located along the centerline of the airplane.

Referring to FIG. 20, in one embodiment, the carry-through structure 46 may be formed as an inboard extension of the wing box 108 of the wing panels 42, 44. The carry-through structure 46 may comprise an upper tension panel 110 and a lower compression panel 112 which are joined together by transversely extending, longitudinally spaced spars 118. The carry-through structure 46 includes at least one longitudinally extending corridor-like passageway 114 therein which may include a floor 116 forming a walk-through aisle connecting the fore and aft sections 84, 86 (FIG. 7) of the mid-level deck 56. FIG. 21 illustrates one half of a carry-through structure 46 that is provided with two of the passageways 114, while FIG. 22 illustrates a carry-through structure that includes a longitudinal passageway 114 extending along the centerline of the airplane 30. The passageway 114 may be a full-height passageway that accommodates the full height of a passenger. For example, a the full-height passageway 114 may be one that can at least accommodate a $75^{th}$ percentile stature adult male without stooping, or 71 inches height, according to the Centers for Disease Control NHANES III anthropometric study data.

Figure 23:
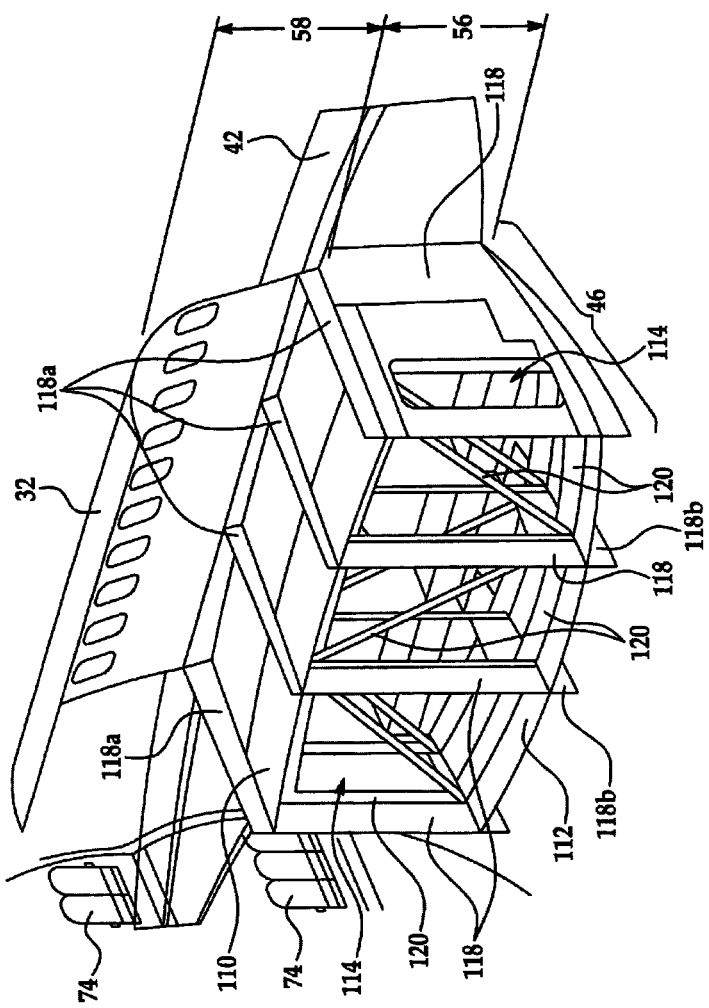
FIG. 23 is a perspective illustration showing further details of the carry-through structure.

Attention is now directed to FIG. 23 which illustrates additional details of the carry-through structure 46. As previously described, the carry-through structure 46 may include upper and lower structural panels 110, 112 respectively which may be fabricated from composite materials, although other materials such as metal may be employed in some embodiments. The panels 110, 112 are connected by transversely extending, longitudinally spaced spars 118 which may comprise panels formed of composite or other materials or other structural elements. Longitudinally extending ribs 120, which may comprise metal or composite truss-like assemblies, are connected to the upper and lower panels 110, 112, as well as adjacent ones of the spars 118 the ribs 120.

The ribs 120 are transversely spaced a distance sufficient to form the longitudinally extending passageways 114, and may include openings (not shown) therein to allow access to support facilities in the carry-through structure 46 located on opposite sides of the passageways 114. The spars 118 may include upper and lower spar extensions 118a, 118b respectively to further strengthen the carry-through structure 46, and to compensate for any shear strength losses due to the presence of the openings in the spars 118 that form the passageways 114.

Referring now to FIGS. 24 and 25, the carry-through structure 46 may include a variety of features or support facilities other than passenger seats, although it is also possible that some passenger or crew seats may be included in the carry-through structure 46. Examples of such support facilities include one or more galleys (not shown), passenger and/or crew rest facilities 90, a galley cart stowage facility (not shown), lavatories 88, storage areas (not shown), a medical facility (not shown), a lounge (not shown), a bar (not shown), and a play area (not shown), to name only a few. In the example illustrated in FIGS. 24 and 25, the carry-through structure 46 includes a plurality of longitudinally spaced lavatories 88 along the inboard side of a passageway 114, as well as crew rest facilities 90 along the outboard side of the passageway 114.

Referring concurrently to FIGS. 24 and 26, a portion of the carry-through structure 46 may be employed to store fuel. For example, a wing tank 124 includes wing sections 126 as well as an inboard central section 128 and an inboard suspended section 130. The inboard central section 128 of the fuel tank 124 may extend partially into the carry-through structure 46, as indicated by the dashed line 128a shown in FIG. 24. Similarly, the inboard suspended section 130 of the fuel tank 124 may extend into the carry-through structure 46 within the lower panel 112. Although not shown in the Figures, a fuel and vapor barrier may be located between each of the said inboard sections 128, 130 and the passageway 114.

Figure 27:
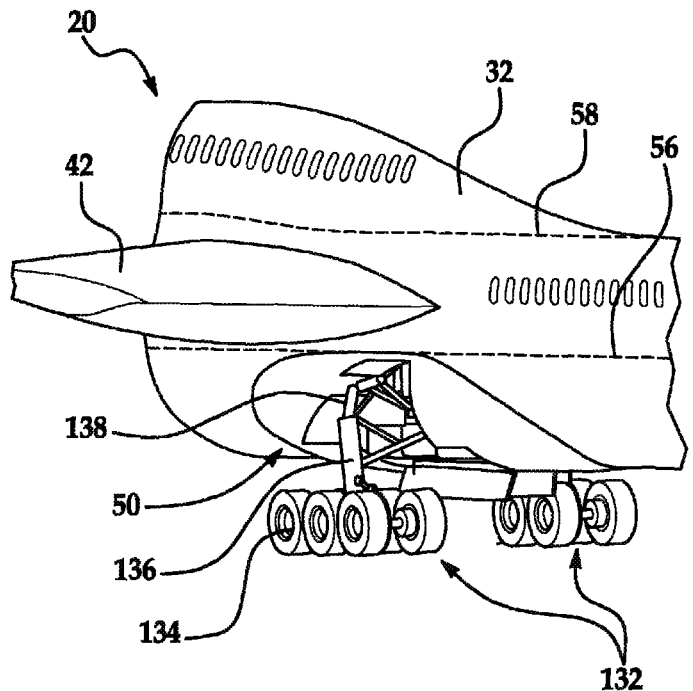
FIG. 27 is a perspective illustration of the main landing gear of the airplane shown in FIGS. 1 and 2.
Figure 28:
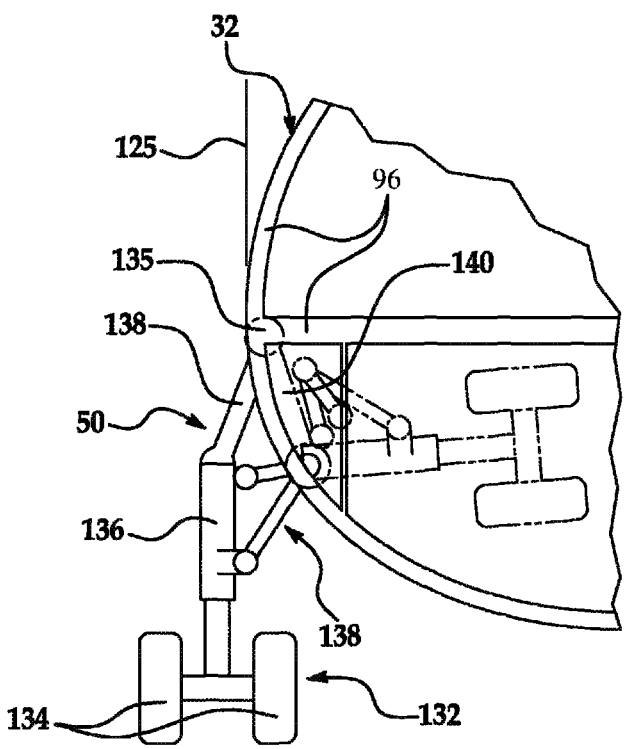
FIG. 28 is an end view showing further details of the landing gear depicted in FIG. 27, the retracted position of the landing gear being shown in dashed lines.

Attention is now directed to FIGS. 27 and 28 which illustrate additional details of the main landing gear 50. The main landing gear 50 may be completely enclosed within the fuselage 32 when stowed, without the need for fairings, thereby further reducing drag and weight, yet when deployed, extends laterally beyond the OML (outer mold line) 125 of the fuselage 32, as shown in FIG. 28, to provide the airplane 30 with sufficient wheel track. The main landing gear 50 may be mounted on one of more frames 96 (FIG. 28) of the fuselage 32. A main landing gear truck 132 carrying a plurality of ground engaging wheels 134 is connected to an oleo strut 136. The oleo strut 136 in turn is connected to a retractable trunnion support structure 138 which rotates about a trunnion pivot 135. A series of links 138 connect the oleo strut 136 to the fuselage structure (FIG. 28). In use, the gear truck 132 retracts laterally inward as the oleo strut 136 is drawn inboard by the MLG actuators. The links 138 function to transmit force to the oleo strut 136 and assist in locking the landing gear 50 in a deployed position. The landing gear 50 may be deployed under the force of gravity. In addition, the main landing gear 50 may employ one or more central landing gear posts 140 for better ground pressure distribution from wheelset 134 to a runway 76.

Figure 29:
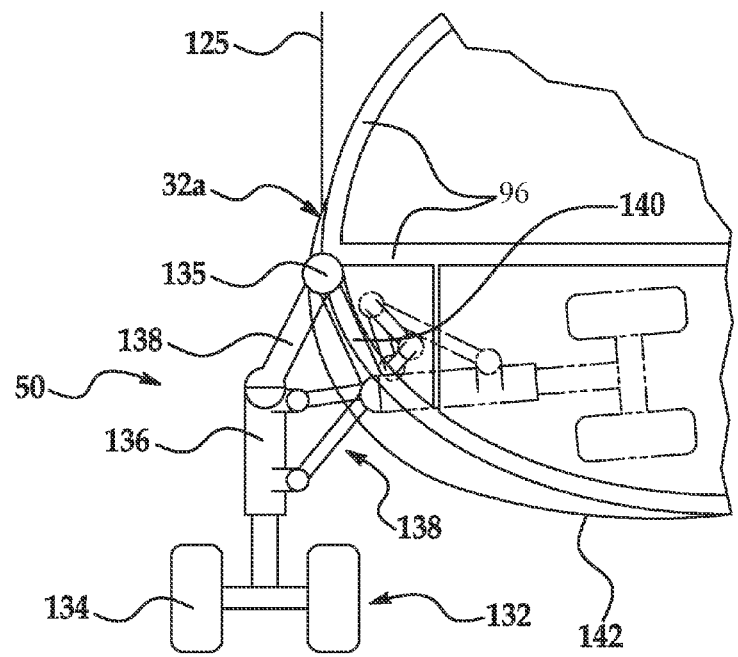
FIG. 29 is an illustration similar to FIG. 28, but showing a main landing gear suitable for use with a mid-wing airplane similar to that shown in FIGS. 12-16.

The main landing gear 50 may be advantageously used with airplanes having a fuselage with any of variety of cross sectional shapes and sizes. For example, as shown in FIG. 29, a fuselage 32a has a slightly elliptical shape which reduces the internal volume of space available to stow the main landing gear 50. In this case, a fairing 142 may be needed to cover only a small outboard portion of the gear 50. Because a majority portion of the retracted gear is stowed inboard of the OML 125, the fairing 142 represents a minimal increase in the wetted area of the airplane 30.

Figure 30:
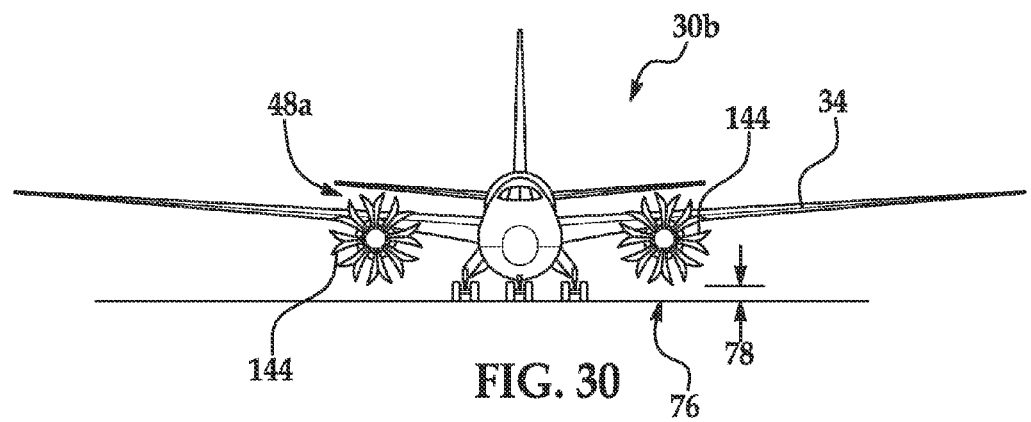
FIG. 30 is an illustration of a front view of another mid-wing airplane having engines with open rotor blades.
Figure 31:
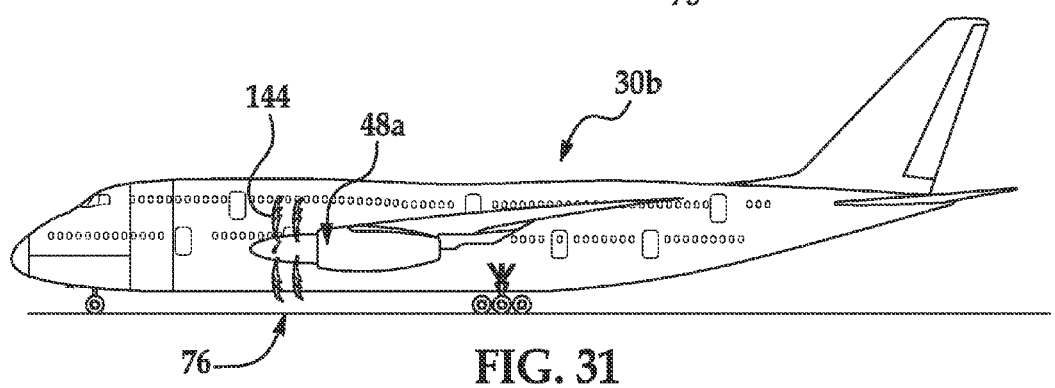
FIG. 31 is a side view illustration of the airplane shown in FIG. 30.

The airplane configuration previously described, including the carry-through structure 46, may be employed on airplanes using other forms of power. For example, referring to FIGS. 30 and 31, a mid-wing airplane 30b employing the carry-through structure previously described has open rotor or unducted fan type engines 48a mounted beneath the wing 34. The open rotor engines 48a include relatively large diameter open blades 144 which, because of the elevation of the wing 34, are spaced sufficiently above the ground such that adequate ground clearance 78 is achieved.

Although the embodiments of this disclosure have been described with respect to certain exemplary embodiments, it is to be understood that the specific embodiments are for purposes of illustration and not limitation, as other variations will occur to those of skill in the art.

What is claimed:

1. An airplane, comprising:
a fuselage including an upper deck having a floor, a mid level deck having a floor, and a lower level deck, wherein the mid level deck is located between the upper deck and the lower level deck;
a wing mounted on the fuselage at the level of the mid level deck, the wing including first and second wing panels respectively on opposite sides of the fuselage and a carry-through wing structure within the fuselage connecting the wing panels, the carry-through wing structure passing transversely through the fuselage and including an upper spar and a lower spar extending continuously across the fuselage and an upper spar extension connected to the upper spar and a lower spar extension connected to the lower spar, at least one substantially full passenger height passageway along the first deck through the carry-through wing structure, wherein the carry-through wing structure is positioned below the floor of the upper deck; and
at least one engine mounted beneath each of the wing panels.

2. The airplane of claim 1, wherein:
the passageway is pressurized,
the carry-through structure further includes longitudinally extending ribs connecting the one or more spars, and
the passageway extends through the spars and between the ribs.

3. The airplane of claim 1, wherein:
the upper deck is adapted to have seats for carrying passengers,
the mid level deck has fore and aft sections adapted to have seats for carrying passengers, and
the carry-through structure includes a crew or passenger support facility.

4. The airplane of claim 3, wherein the support facility includes at least one of:
a galley,
a galley cart stowage facility,
a lavatory,
a crew rest facility,
a passenger rest facility,
a medical facility,
a lounge,
a bar,
a play area, and
a storage facility.

5. The airplane of claim 1, wherein the carry-through structure includes fuel storage.

6. The airplane of claim 1, further comprising:
main landing gear mounted on the fuselage and having a majority portion thereof retractable entirely within the fuselage beneath the first deck, and
wherein the main landing gear is mounted on the fuselage for swinging movement from a inboard retracted position to a deployed outboard position.

7. The airplane of claim 1, wherein the fuselage includes:
a wheel well adapted for housing main landing gear, and
the lower level deck is a cargo deck beneath the mid level deck and capable of accommodating at least one of bulk cargo and a unit load device comprising at least one of an LD-3 container, an LD-1 container, an LD-2 container, an LD-3-46 container and an LD-3-45 container, the cargo deck including first and second cargo sections respectively fore and aft of the wheel well.

8. An airplane, comprising:
a generally tubular fuselage including at least a first longitudinally extending payload carrying deck and a second longitudinally extending payload carrying deck stacked above the first deck; and
a wing mounted on the fuselage, the wing passing transversely through the first deck and dividing the first deck into fore and aft sections, the wing including carry-through structure extending continuously transversely through the fuselage, the carry-through structure including an upper structural panel, a lower structural panel, at least one spar connected to both the upper structural panel and the lower structural panel, and a longitudinal passageway through the at least one spar and between the upper and lower structural panels allowing walk-through between the fore and aft sections of the first deck, the carry-through structure includes a first set of structural members connected between the upper and lower structural panels and extending transversely through the first deck, and a second set of structural members connected between the upper and lower structural panels and extending longitudinally through the first deck, wherein the structural members in the first set thereof include aligned openings defining the longitudinal passageway in the carry-through structure.

9. The airplane of claim 8, wherein the first deck and the passageway may be pressurized.

10. The airplane of claim 8, wherein:
the fore and aft sections of the first deck each include passenger seating and at least one aisle, and
the passageway forms a substantially full passenger height corridor in the wing carry-through structure connecting the aisles in the fore and aft sections of the first deck.

11. The airplane of claim 8, wherein the cross section of the fuselage is a double lobe configuration.

12. The airplane of claim 8, wherein the fuselage includes:
a double lobe frame forming a longitudinally extending outer recess in the fuselage,
a composite skin covering the frame, including the recess.

13. The airplane of claim 8, further comprising:
at least one utility disposed within a recess and extending longitudinally along the fuselage.

14. The airplane of claim 8, wherein:
the first set of structural members are spars,
the second set of structural members are ribs, and
the spars extend vertically beyond the upper and lower structural panels.

15. The airplane of claim 8, wherein a majority portion of the carry through structure is formed of composite materials.

16. A mid-wing, multi-deck airplane, comprising:
a generally tubular fuselage including at least a lower cargo deck, a longitudinally extending mid-level passenger deck above the cargo deck, and a longitudinally extending upper passenger deck above the mid-level deck;
a mid-level wing attached to the fuselage and passing through the mid-level deck, the wing including first and second wing panels respectively on opposite sides of the fuselage and a spar of a carry-though structure connecting the wing panels, the carry-through structure extending continuously transversely through the fuselage and dividing the mid-level deck into fore and aft sections, the carry-through structure including at least one longitudinally extending passageway through the spar forming a substantially full height walk-though aisle allowing a person to walk between the fore and aft sections;
upper and lower structural panels vertically spaced from each other and extending transversely across the fuselage;
a plurality of transversely extending spars connected between the upper and lower panels and extending transversely through the mid-level deck, the plurality of transversely extending spars extend vertically beyond the upper and lower structural panel;
a plurality of rib members connected between the upper and lower structural panels and extending longitudinally through the mid-level deck;
a least one engine mounted on each of the wing panels beneath the wing; and
main landing gear mounted on the fuselage and having a majority portion thereof retractable entirely within the fuselage beneath the mid-level passenger deck.

17. The airplane of claim 16, wherein:
the passenger decks and the passageway may be pressured, and
the carry through structure includes at least one of:
a galley,
a galley cart stowage facility,
a lavatory,
a crew rest facility,
a passenger rest facility,
a medical facility,
a lounge,
a bar,
a play area and
a storage facility.

18. The airplane of claim 16, further comprising:
first and second fuel tanks respectively within the first and second wing panels, each of the fuel tanks including an inboard portion extending into the carry-through structure.

19. The airplane of claim 16, wherein each of the engines is a large diameter high efficiency engine.

20. The airplane of claim 16 further comprising a spar extension connected to the spar of the carry-through structure.

* * * * *